United States Patent [19]
Dumas et al.

[11] Patent Number: 5,519,773
[45] Date of Patent: May 21, 1996

[54] CALL SHARING FOR INBOUND AND OUTBOUND CALL CENTER AGENTS

[75] Inventors: Gregory P. Dumas, Milpitas; Mark M. Perkins, Cupertino; Charles M. White, San Jose, all of Calif.

[73] Assignee: Siemens Colm Communications Inc., Santa Clara, Calif.

[21] Appl. No.: 255,155

[22] Filed: Jun. 7, 1994

[51] Int. Cl.⁶ .................................................. H04M 3/46
[52] U.S. Cl. .......................... 379/265; 379/266; 379/309; 379/216
[58] Field of Search ...................... 379/265, 266, 379/309, 137, 214, 216

[56] References Cited

U.S. PATENT DOCUMENTS

| | | | |
|---|---|---|---|
| 4,881,261 | 11/1989 | Oliphant et al. | 379/215 |
| 5,181,236 | 1/1993 | LaValle et al. | 379/266 |
| 5,185,782 | 2/1993 | Srinivasan | 379/266 |
| 5,214,688 | 5/1993 | Szlam et al. | 379/137 |
| 5,247,569 | 9/1993 | Cave | 379/266 |
| 5,295,184 | 3/1994 | Smith et al. | 379/216 |
| 5,311,574 | 5/1994 | Livanos | 379/266 |
| 5,327,490 | 7/1994 | Cave | 379/266 |
| 5,425,093 | 6/1995 | Trefzger | 379/266 |

*Primary Examiner*—Jeffery Hofsass
*Assistant Examiner*—Parag Dharia

[57] ABSTRACT

Method for multiplexing inbound and outbound calls from a call center to improve the efficiency of call center agents since an idle agent can sometimes place an outbound call rather than wait for another inbound call. A parameter k is used to have an ACD agent place an outbound call instead of waiting to receive an inbound call. Specifically, if more than k agents in an inbound/outbound ACD call group are idle, and no calls are in the inbound call queue, then, in accordance with the present invention, callback or outbound calls are assigned to idle ACD agents until k agents are idle. For example, in a preferred embodiment of the present invention, callback calls will be assigned to an ACD agent before outbound calls. Note that, in accordance with the present invention, at any instant, at most k agents will be idle, because as soon as k+1 agents are idle, an agent will be assigned to a callback or to an outbound call.

2 Claims, 6 Drawing Sheets

CALL SHARING FOR INBOUND AND OUTBOUND CALL CENTER AGENTS

TECHNICAL FIELD OF THE INVENTION

The present invention relates to a method for call sharing by inbound and outbound call center agents.

BACKGROUND OF THE INVENTION

Typically, an Automatic Call Distribution (ACD) function is provided in conjunction with a computerized Private Branch Exchange (PBX). This ACD function enables a group of agents, termed ACD agents, to handle a high volume of inbound calls and simultaneously allows a queued caller to listen to recordings when waiting for an available ACD agent. The ACD function typically informs inbound callers of their status while they wait and the ACD function routes callers to an appropriate ACD agent on a first-come-first-served basis.

Today, all full-featured PBXs provide the ACD function and there are even vendors who provide switches specifically designed to support the ACD function. The ACD function has been expanded to provide statistical reporting tools, in addition to the call queuing and call routing functions mentioned above, which statistical reporting tools are used to manage the call center. For example, ACD historical reports enable a manager to identify times: (a) when inbound callers abandon calls after long waits in a queue because, for example, the call center is staffed by too few ACD agents and (b) when many ACD agents are idle. In addition, ACD forecasting reports, based on the historical reports, allow the manager to determine appropriate staffing levels for specific weeks and months in the future.

Over time, the scope of the call center has increased. In particular, companies realized that if it was useful to provide telephone service for customers wishing to call them, it would also be useful for the companies to call their customers (or potential customers) directly. This function is commonly referred to as outbound telemarketing. Currently, agents making outbound calls, referred to as outbound agents, are separate from ACD agents handling inbound calls and call center software separately manages outbound call lists for outbound agents to ensure that each outbound agent wastes little time in dialing or in performing overhead operations.

Today, call center managers want to connect a caller to an ACD agent having exactly the right skills to serve the caller. However, "skills based" ACD agent groups are often small and, as a result, whenever an inbound call arrives, all such "skills based" ACD agents may be busy. In such instances, the ACD function can take call back instructions from the caller and the ACD function can manage the call back functions, for example, by assigning such calls, in accordance with the caller instructions, to a "skills based" ACD agent whenever one becomes available.

However, despite the ability of ACD functions to manage inbound calls separately from outbound calls, there is a need in the art for a method for managing the call center ACD operation in an efficient manner by combining the management of outbound and inbound calls.

SUMMARY OF THE INVENTION

Advantageously, an embodiment of the present invention provides a method for managing call center ACD operations in an efficient manner by combining the management of outbound and inbound calls. In particular, an embodiment of the present invention is a method for operating an ACD system wherein a single group of ACD agents handles inbound calls, outbound calls, and callback calls, which method comprises the steps of: (a) detecting when an inbound call arrives at the ACD system; an ACD agent completes a call; or a call on an inbound call queue times out; (b) if an inbound call arrives, determining whether at least one ACD agent is free; (aa) if at least one ACD agent is free, assigning the inbound call to one of the at least one free ACD agent; (bb) if no ACD agent is free, placing the inbound call in the inbound call queue; (c) if an ACD agent completes a call, if there is a call in the inbound queue, assigning a call from the inbound call queue to an ACD agent; otherwise (aa1) determining whether more than a predetermined number of ACD agents are free; (bb1) if more than a predetermined number of ACD agents are free, assigning one of the free ACD agents to handle a call in a callback queue or assigning one of the free ACD agents to handle an outbound call; and (d) a call on an inbound call queue times out, removing the call from the inbound call queue and placing the call on the callback queue.

DETAILED DESCRIPTION

In accordance with the present invention, an ACD function utilizes an Automatic Call Sharing (ACS) algorithm to enable inbound and outbound call functions to be performed by one ACD agent. Advantageously, in accordance with the present invention, ACD agent idle time is used to make outbound calls, while maintaining a desired level of service on inbound calls. As will be described in detail below, embodiments of the present invention accomplish the desired function by utilizing the ACS algorithm to determine when an ACD agent assignment to work on outbound calls will be given priority over the agent's waiting to work on inbound calls.

Figure 7:
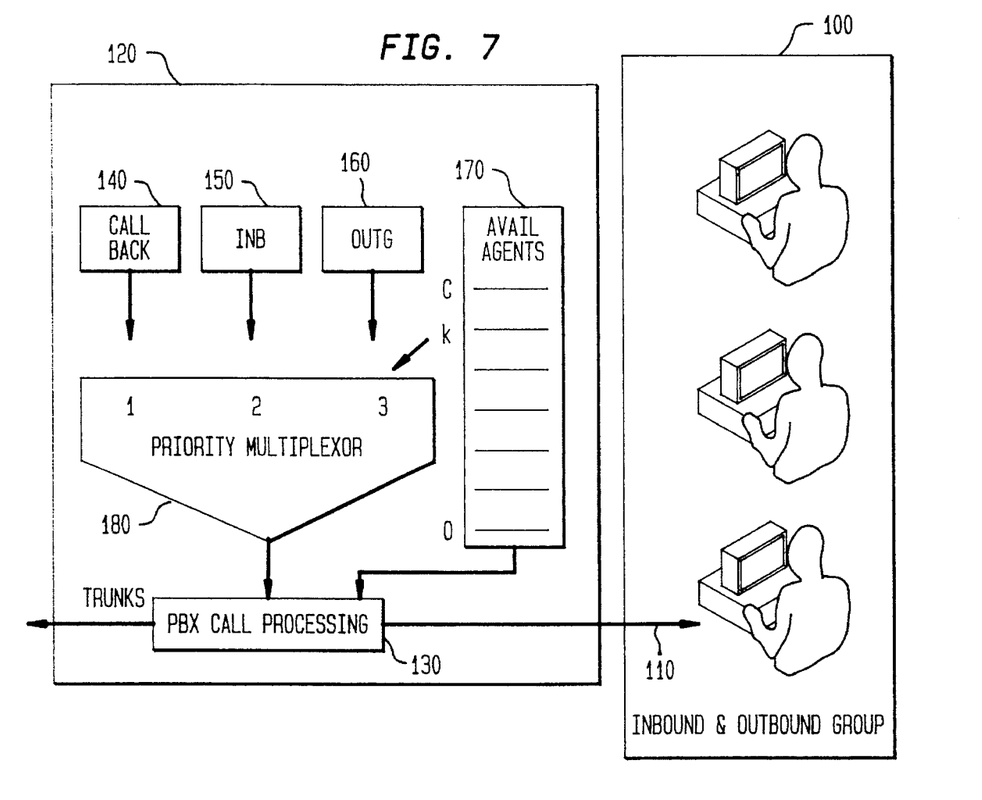
FIG. 7 shows, in pictorial form, an embodiment of the present invention wherein an ACD system enables agents to handle inbound calls, outbound calls, and callback messages.

FIG. 7 shows, in pictorial form, an embodiment of the present invention wherein an ACD system enables agents to handle inbound calls, outbound calls, and callback messages. As shown in FIG. 7, 100 represents a group of inbound and outbound ACD agents which utilize conventional ACD terminals, which ACD terminals utilize conventional telecommunication interconnections, illustrated as connections 110, to PBX 120. As is well known to those of ordinary skill in the art, the ACD terminals may be interfaced to computer systems which contain data bases having information which are displayed at the terminals for use in communicating with inbound callers and with outbound called parties. Further, it is well known to those of ordinary skill in the art that such computer systems obtain information pertaining to the callers from PBX 120 so as to be able to coordinate the call and the presentation of information relating to the call to the ACD agents.

As shown in FIG. 7, PBX call processing module 130 is conventional and is well known to those of ordinary skill in the art and performs functions such as receiving a telephone call from an inbound caller, placing an inbound telephone call in a queue, connecting an inbound caller or a caller in a queue to an ACD agent, placing an outbound call, and so forth. What is considered new, is the portion of PBX 120 denoted as callback queue 140, inbound call queue 150, outbound call queue 160, list 170 of available ACD agents, priority multiplexor 180, and the manner in which priority multiplexor 180 operates to provide a method to enable inbound and outbound call functions to be performed by one ACD agent. As will be described below, the functions performed in accordance with the present invention are carried out in software which is executed by a processor in PBX 120. This is the preferred embodiment since modern PBXs are comprised of processors which are, in essence, computers which control the operation of the PBX.

Priority multiplexor 180 utilizes an inventive ACS algorithm to define a new parameter, k, which is used as follows. If more than k ACD agents are free, and the inbound call queue is empty, then an outbound call is assigned to a free ACD agent. As a special case, when k=0 and no agents are idle, whenever an agent becomes idle, that agent either is given an inbound call out of the inbound call queue (if possible) or is assigned to an outbound call.

Figure 1:
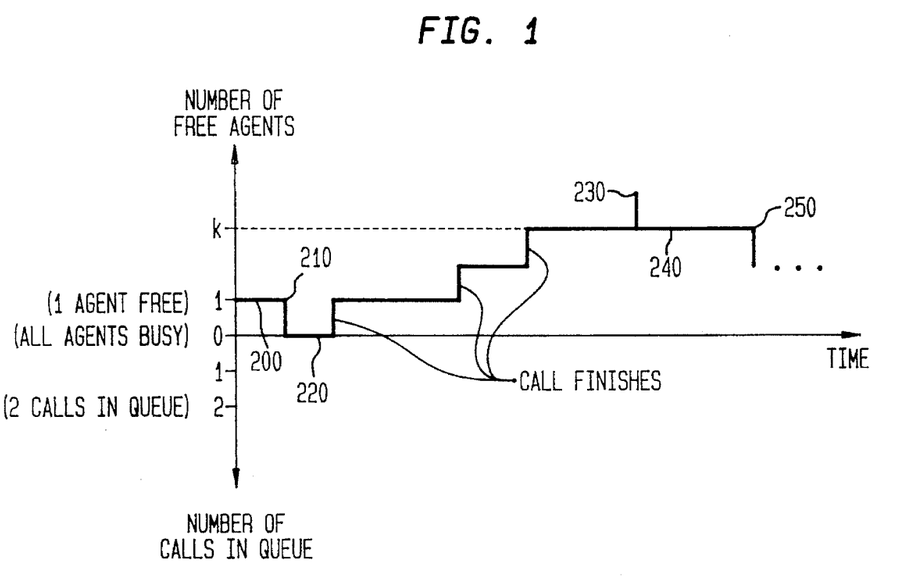
FIG. 1 shows, in graphical form, a scenario that helps to illustrate the manner in which the inventive ACS algorithm operates.

FIG. 1 shows, in graphical form, a scenario that helps to illustrate the manner in which the inventive ACS algorithm operates. As shown in FIG. 1, in time frame 200, an ACD agent is free and waiting for an inbound call, the remaining ACD agents are busy dealing with calls. An inbound call arrives at time 210 and the call is assigned to the free agent. Agents finish dealing with calls over time frame 220 until k agents are free. Then, at time frame 230, a call is completed and more than k agents are free. At this time, in accordance with the inventive ACS algorithm, a free agent is assigned to an outbound call. Later, in time frame 240, there are k free agents waiting for an inbound call and the remaining agents are busy dealing with calls. Finally, at time frame 250, an inbound call arrives and it is assigned to a free agent.

Figure 9:
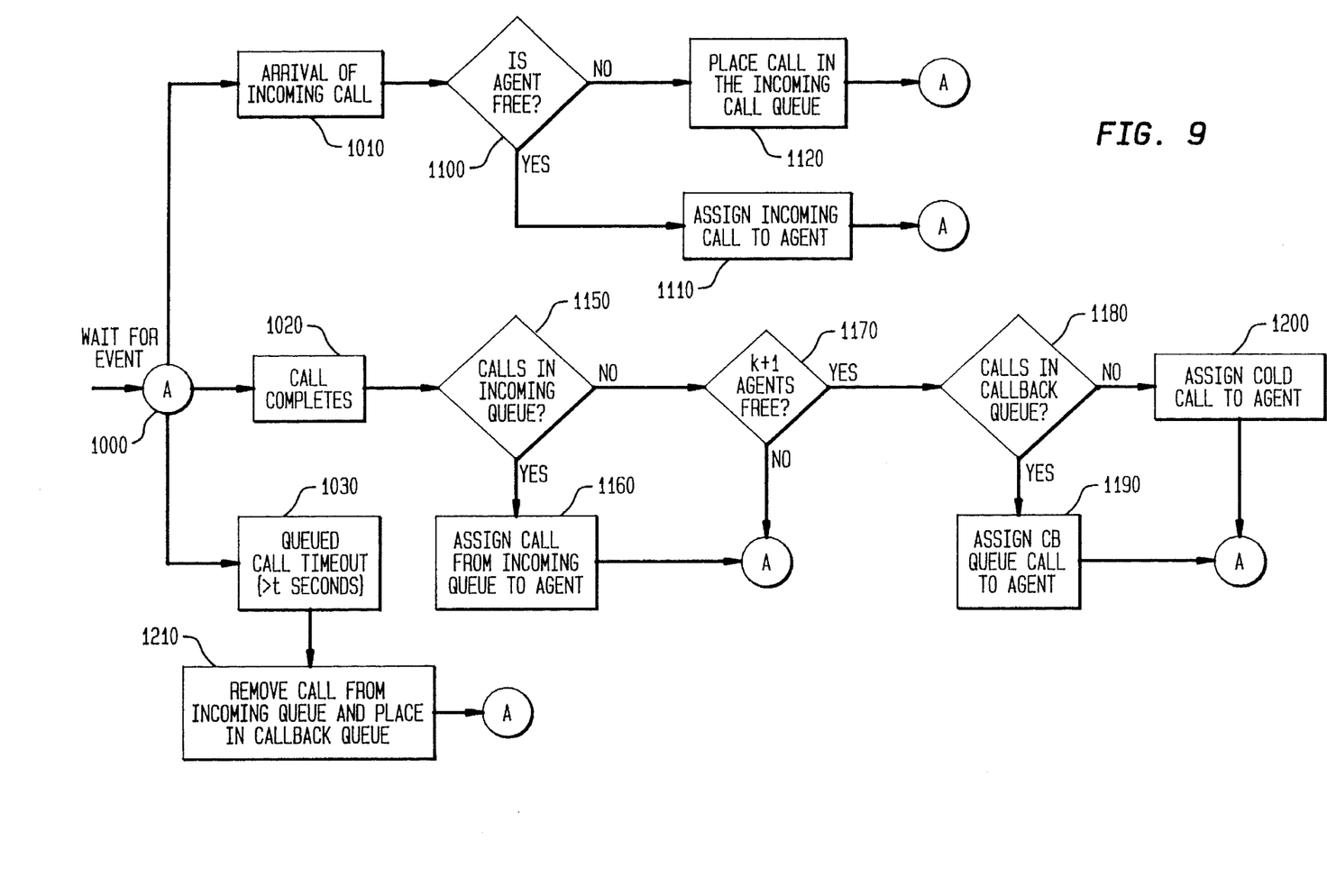
FIG. 9 is a flowchart of the inventive ACS algorithm which is carried out by the priority multiplexor shown in FIG. 7.

FIG. 9 is a flowchart of the inventive ACS algorithm which is carried out by priority multiplexor 180. As shown in FIG. 9, at box 1000, priority multiplexor 180 waits for an event to occur and then branches to box 1010, 1020, or 1030, depending on the type of event that occurs. Priority multiplexor transfers to: (a) box 1010 whenever an inbound call arrives; (b) box 1020 whenever a call being handled by an ACD agent completes; and (c) box 1030 whenever a call is in the inbound call queue for greater than a predetermined length of time.

At box 1010, priority multiplexor 180 transfers control to decision box 1100 to determine whether an ACD agent is free. At decision box 1100, if an ACD agent is free, priority multiplexor 180 transfers control to box 1110, otherwise, priority multiplexor 180 transfers control to box 1120.

At box 1110 (an ACD agent is free), priority multiplexor 180 assigns the inbound call to an available ACD agent and then transfers control to box 1000 to await the next event. At box 1120 (no ACD agents are free), priority multiplexor 180 places the inbound call in the inbound call queue and then transfers control to box 1000 to await the next event.

At box 1020, priority multiplexor 180 transfers control to decision box 1150 to determine whether there are calls waiting in the inbound call queue. At decision box 1150, if there are calls in the inbound call queue, priority multiplexor 180 transfers control to box 1160, otherwise, priority multiplexor 180 transfers control to decision box 1170.

At box 1160, priority multiplexor 180 assigns a call in the inbound call queue to an available ACD agent. Then, priority multiplexor 180 transfers control to box 1000 to await the next event. At decision box 1170, priority multiplexor 180 determines whether (k+1) agents are free. If so, priority multiplexor 180 transfers control to decision box 1180, otherwise, priority multiplexor 180 transfers control to box 1000 to await the next event.

At decision box 1180, priority multiplexor 180 determines whether there are any calls in the callback queue. If so, priority multiplexor 180 transfers control to box 1190, otherwise, priority multiplexor 180 transfers control to box 1200.

At box 1190, priority multiplexor 180 assigns a call from the callback queue to a free ACD agent and then transfers control back to box 1000 to await the next event. At box 1200, priority multiplexor 180 assigns a cold-call to an ACD agent, i.e., an outbound call to a potential customer or client, and then transfers control back to box 1000 to await the next event.

At box 1030, priority multiplexor 180 transfers control to box 1210. At box 1210, priority multiplexor 180 removes the call from the inbound call queue and places it into the callback queue. Then, priority multiplexor 180 transfers control back to box 1000 to await the next event.

As discussed above, the parameter k is used to have an ACD agent place an outbound call instead of waiting to receive an inbound call. Specifically, if more than k agents in the inbound/outbound ACD call group are idle, and no calls are in the inbound call queue, then, in accordance with the inventive ACS algorithm, callback or outbound calls are assigned to idle ACD agents until k agents are idle. For example, in a preferred embodiment of the present invention, callback calls will be assigned to an ACD agent before outbound calls. Note that, in accordance with the present invention, at any instant, at most k agents will be idle, because as soon as k+1 agents are idle, an agent will be assigned to a callback or to an outbound call.

In accordance with the inventive ACS algorithm, the call center manager controls the number of combined inbound/ outbound ACD agents and outbound call parameter k controls handling of outbound calls as well as inbound calls. In accordance with the present invention, in managing the call center, the call center manager can alter k at any time, i.e., outbound call parameter k is not fixed or constant within the PBX.

Note that the quality of inbound call handling service depends on k. Whenever k is set to 0, all ACD agents are always busy, however, all inbound callers must wait for service. For example, the fifth inbound caller in the inbound call queue will wait for five (5) calls to complete (either inbound, outbound, or callback) before being served.

In summary, in accordance with the present invention, multiplexing of inbound and outbound calls enables each ACD agent to provide the following three functions: (a) accepting an inbound call as soon as it rings; (b) returning a call per the caller's instructions; or (c) calling prospective customers directly. Advantageously, the number of agents required to perform these functions is much less than the number of agents required to perform these functions in a traditional call center.

In light of the above, in order to utilize embodiments of the present invention, one needs to determine k. k is determined differently for two different situations. The first situation corresponds to a system where there is no callback and inbound callers wait on the inbound queue until they are served and whenever there are more than k idle ACD agents, the excess are assigned to making outbound calls. The second situation corresponds to a system where there is callback.

In the first situation, k is determined in accordance with the following. Use is made of an extension of the well known M/M/c queuing model where it is assumed that inbound calls follow a Poisson process and that call hold times are distributed exponentially. A Poisson, or random, inbound call process is generally a good assumption based on the fact that there is not any particular interrelationship among the callers. The exponentially distributed call hold times, while not always an accurate assumption, provide a tractable model that can form the basis for staffing decisions based on a desired level of service. In this first situation, if more than k ACD agents are idle (and there are no calls in the inbound call queue), one of the idle ACD agents will dial an outbound call rather than wait for an inbound call. As a result, at no time will more than k agents be free.

There are a number of level of service measures used in this situation, including: average queue length, average waiting time in the queue, probability of waiting in the queue for less than a certain time, and probability of not having to wait in the queue. The following notation is used for the parameters describing the operation of the queue as well as the level of service parameters.

Inputs:

| | |
|---|---|
| c | is the number of ACD agents |
| μ | is 1/(average call duration) |
| λ | is the inbound call rate |
| k | is the maximum number of free ACD agents before an outbound call is dialed |

Internal parameters:

| | |
|---|---|
| r | = λ/μ |
| l | = c - k (There will always be at least 1 customers in the system because an additional outbound call is dialed whenever fewer than 1 customers are present) |
| Pl | is probability that there are l customers in the queue, including outbound calls |

Outputs (Level of Service variables)

| | |
|---|---|
| γ | is the outbound call rate |
| $\gamma_{max}$ | is the largest achievable outbound call rate (achieved when k = 0) |
| $L_q$ | is the average inbound call queue length |
| $W_q$ | is the average waiting time in the inbound call queue |
| $W_q(0)$ | is the probability of having no wait in the inbound call queue |
| $W_q(t)$ | is the probability that waiting time in the inbound call queue is not more than t |

Using the terminology introduced above, the levels of service for this queuing system are given by the following equations:

$$p_l = \left[ \sum_{n=0}^{k-1} \frac{r^n}{(n+l)!/l!} + \frac{cr^k}{(c!/l!)(c-r)} \right]^{-1}, (r/c < 1) \quad (1)$$

$$W_q = \left[ \frac{cr^{k+1}}{\lambda(c!/l!)(c-r)^2} \right] p_l \quad (2)$$

$$L_q = \lambda W_q \quad (3)$$

$$W_q(0) = 1 - \frac{r^k}{c!/l!} \frac{c}{(c-r)} p_l \quad (4)$$

$$W_q(t) = 1 - (1 - W_q(0))e^{-(\mu c - \lambda)t}, (t > 0) \quad (5)$$

$$\gamma = l\mu p_l \quad (6)$$

$$\gamma_{max} = \mu c - \lambda \quad (7)$$

Figure 10:
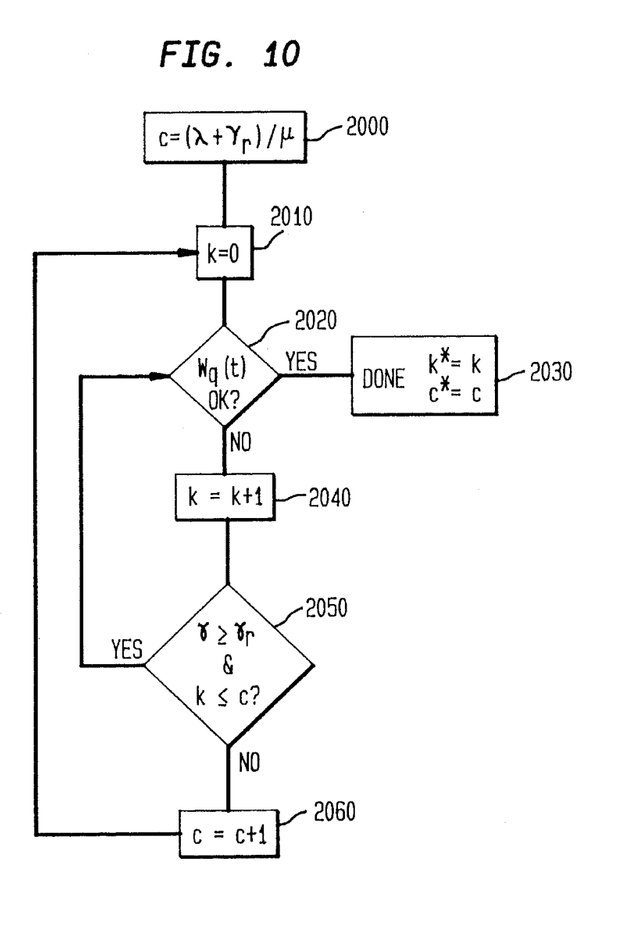
FIG. 10 is a flowchart of a method for determining the minimum number of agents required at a call center operating in accordance with the present invention for a predetermined level of service, which call center operates without callback.

FIG. 10 is a flowchart of a method for determining the minimum number of agents required at a call center for a predetermined level of service, which call center operates without callback. As shown in FIG. 10, at box 2000, c is set equal to the inbound call rate λ plus the required outbound call rate $\gamma_r$ multiplied by the average call duration 1/μ. Then, control is transferred to box 2010. At box 2010, k is set equal to 0. Then, control is transferred to decision box 2020. At decision box 2020, a determination is made as to whether $W_q$, i.e., the inbound level of service, satisfies predetermined constraints. If so, control is transferred to box 2030, otherwise control is transferred to box 2040. At box 2030, c* is the minimum number of ACD agents which are needed to provide the predetermined inbound level of service and the required outbound call rate and k* is the value of k to use with c* agents in the inventive ACS algorithm to meet the call handling requirements. The value of k* is then input to PBX 120 for use by priority multiplexor 180 in accordance with the above description.

At box 2040, k is incremented by 1. Then, control is transferred to decision box 2050. At decision box 2050, a determination is made whether $\gamma \geq \gamma_r$ and k≤c. If so, control is transferred to decision box 2020, otherwise, control is transferred to box 2060. Finally, at box 2060, c is incremented by 1 and control is transferred to box 2010.

As one can readily appreciate from the above, the flow chart shown in FIG. 10 can be implemented on a processor to enable call center management to determine c and k for use in implementing the inventive ACS algorithm.

Figure 2:
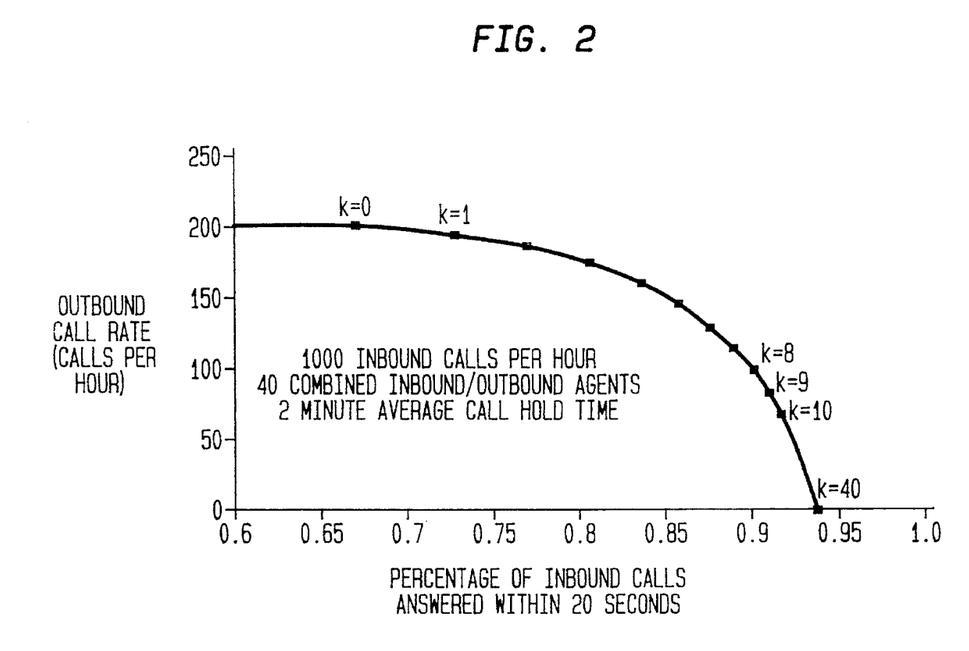
FIG. 2 shows, in graphical form, the effect of different values of k used in the inventive ACS algorithm on level-of-service measures without callback.

FIG. 2 shows, in graphical form, the effect on the level of service measures of different values of k for the first situation. FIG. 2 shows how different values of k affect the tradeoff between outbound call rate and level of service (in this case the percentage of calls answered within 20 seconds). In general, smaller values of k tend to favor outbound calls while larger values of k favor the timely handling of inbound calls.

The graph in FIG. 2 shows the performance of a call center with 40 agents, receiving 1000 calls per hour. If such a call center were managed entirely as an inbound center, 94% of the calls would be answered within 20 seconds. This results in the best grade of service but the lowest outbound call rate. The call center could also manage 1000 inbound calls per hour plus 100 outbound calls per hour using the inventive ACS algorithm. For example, when k=8, 90% of the inbound calls are answered within 20 seconds.

As can be seen from the graph in FIG. 2, smaller values of k produce more outbound calls per hour but with a reduced level of service for inbound calls. Thus, k can change the focus of the group from inbound to outbound calls. The maximum outbound call rate can be achieved by setting k=0. Since all inbound calls must eventually be processed and only a fixed number of agents are available, the maximum outbound call rate that can be achieved is (see eqn 7):

$$\gamma_{max} = \mu c - \lambda = 30*40 - 1000 = 200 \text{ (20\% of inbound calls)}$$

Figure 3:
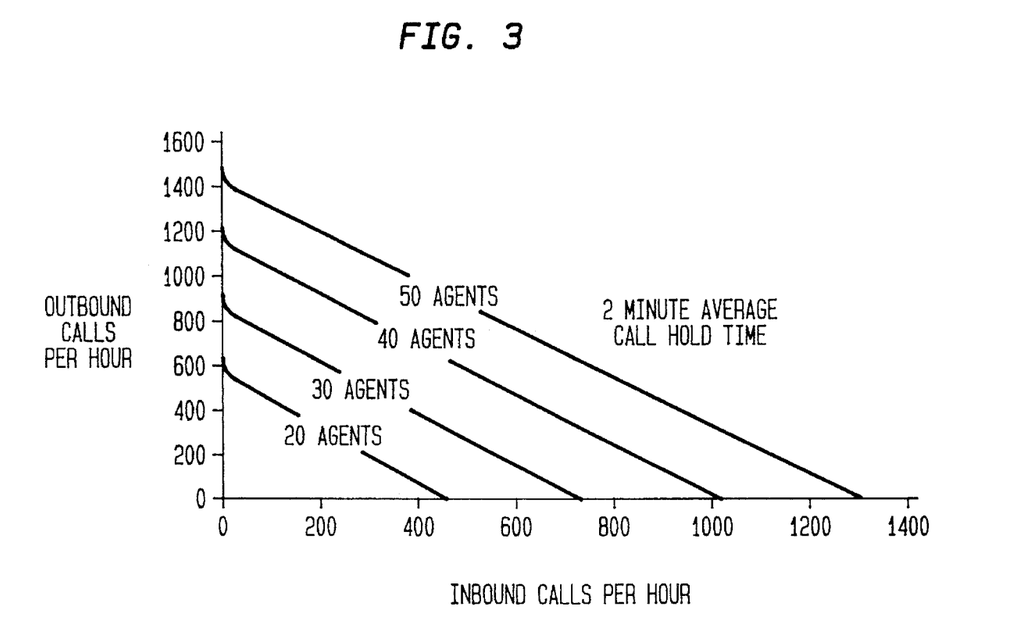
FIG. 3 shows, in graphical form, inbound and outbound call rates which can be supported by traditional call centers with different sizes of groups of agents.
Figure 4:
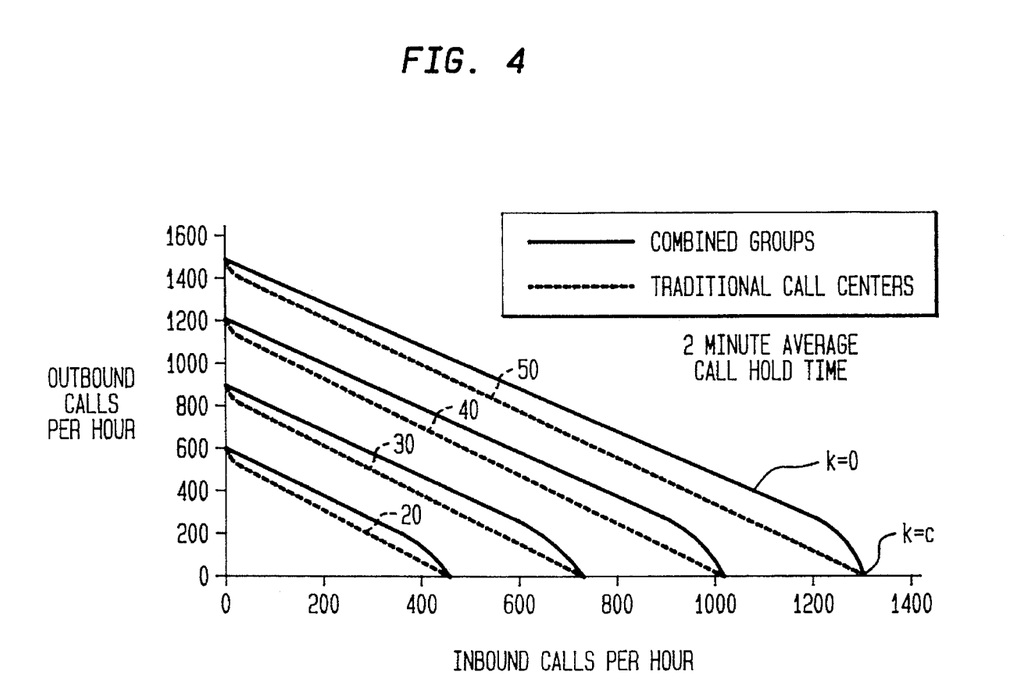
FIG. 4 shows, in graphical form, corresponding capacities for call centers in which the inventive ACS algorithm is used to multiplex inbound and outbound calls to a single group of agents.
Figure 5:
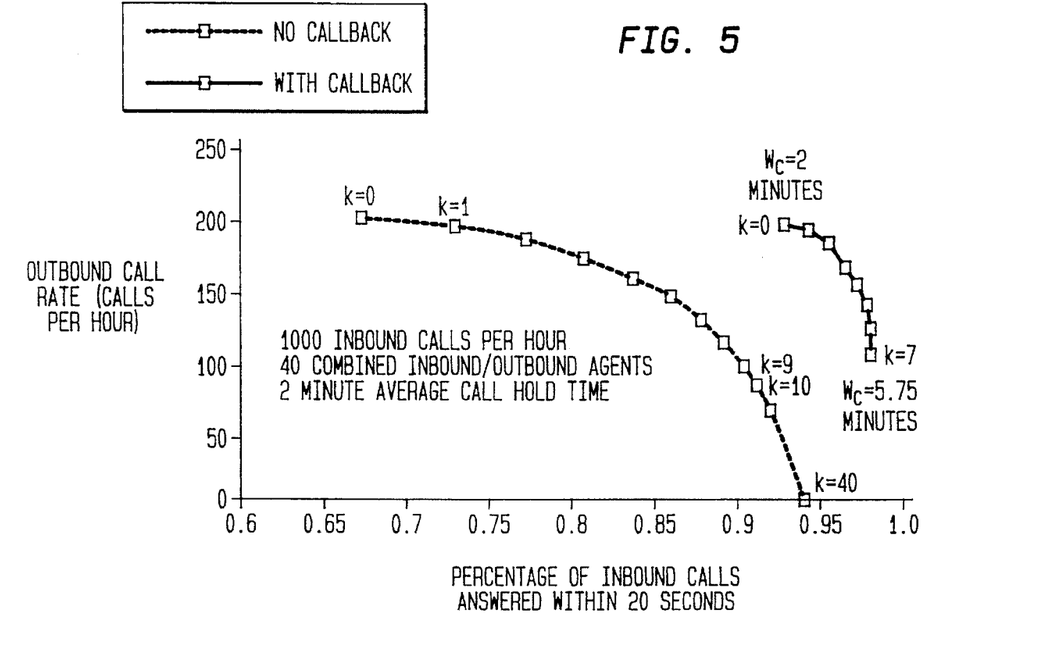
FIG. 5 shows, in graphical form, the effect of different values of k used in the inventive ACS algorithm on level-of-service measures with callback.

FIG. 3 shows, in graphical form, the inbound and outbound call rates which can be supported by traditional call centers with different group sizes, for example, with 20 through 50 agents. In the traditional call center, the inbound agents are in a separate group from the outbound agents. FIGS. 3–5 are based on a level of service where 90% of inbound calls are answered within 20 seconds.

For comparison, FIG. 4 shows, in graphical form, corresponding capacities for combined call centers in which the inventive ACS algorithm is used to multiplex inbound and outbound calls to a single group of agents. Once again, 90% of inbound calls are answered with 20 seconds.

As an example of agent savings that occur with the use of the inventive ACS algorithm, a traditional inbound group of 15 agents can handle 330 calls per hour while answering 90% of the calls within 20 seconds. A separate outbound group of 5 agents could make an additional 150 outbound calls per hour. A combined group of 18 agents (saving 40% of the 5 outbound agents) can handle 330 inbound calls and 150 outbound calls per hour. This represents a saving of 10% in agent costs.

With a larger group, the savings are similar. For example, an inbound group of 45 agents can handle 1175 calls per hour while answering 90% of the calls within 20 seconds. A separate outbound group of 10 agents could make an additional 300 outbound calls per hour. A combined group of 50 agents (saving 50% of the 10 outbound agents) can make 300 outbound calls per hour and handle 1175 inbound calls per hour, answering at least 90% of the calls within 20 seconds. This represents a savings of 9% in agent costs.

In the second situation, instead of forcing customers to wait for an extended period of time for service, customers who have waited in the inbound call queue for a certain period of time are called back at a later time. This has the effect of limiting queue lengths and allowing customers to pursue other activities while waiting to be called back.

From the point of view of the call center, customers requesting to be called back represent an additional source of outbound calls. These outbound calls are made in accordance with the inventive ACS algorithm, based on the current value of k. However, in this embodiment, customers requesting callback receive priority over other outbound calls.

In addition to the standard level of service measures, we introduce a new measure for callback systems: $W_c$ which is the average time to wait for a callback.

Figure 11:
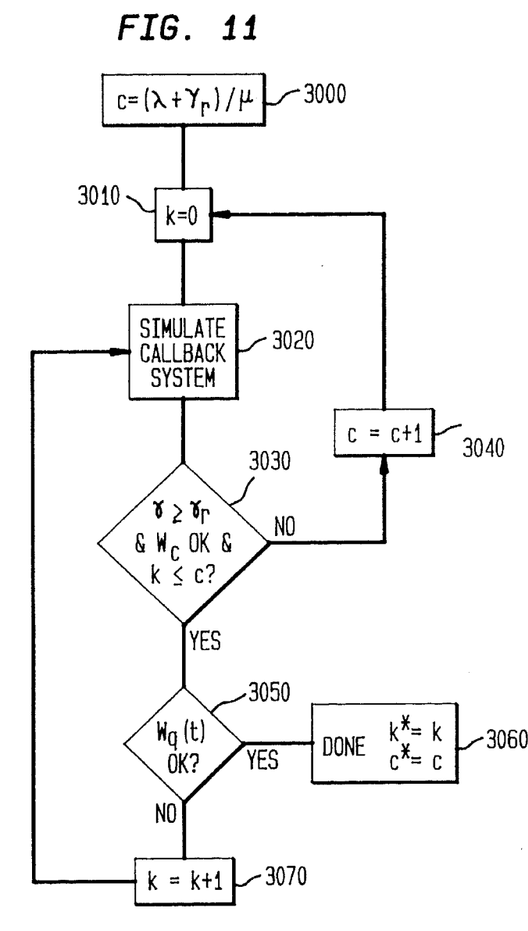
FIG. 11 is a flowchart of a method for determining the minimum number of agents required at a call center operating in accordance with the present invention for a predetermined level of service, which call center operates with callback.

Since analytic results are not available for this model, a discrete event simulation was used to estimate the level of service parameters for callback systems with various input parameters. A RESQ simulation package was used to simulate the operation of the PBX system using the ACS algorithm with callback. This simulation package is referenced in a document by R. F. Gordon and E. A. MacNair entitled "The Research Queuing Package Modeling Environment (RESQME) Version 4.7 Guide for OS/2 and RS/6000," IBM Research Division Report, Jul. 15, 1993. In the second situation, k is determined in accordance with the following. FIG. 11 is a flowchart of a method for determining the minimum number of agents required at a call center for a predetermined level of service, which call center operates with callback. As shown in FIG. 11, at box 3000, c is set equal to the inbound call rate $\lambda$ plus the required outbound call rate $\gamma_r$ multiplied by the average call duration $1/\mu$. Then, control is transferred to box 3010. At box 3010, k is set equal to 0. Then, control is transferred to box 3020. At box 3020, a simulation is made of the callback system in order to determine the expected level of service parameters and outbound call rate. Then, control is transferred to decision box 3030.

At decision box 3030, a determination is made as to whether $\gamma \geq \gamma_r$ and $W_c$, the callback level of service, satisfies predetermined constraints and $k \leq c$. If so, control is transferred to decision box 3050, otherwise, control is transferred to box 3040. At box 3040, c is incremented by 1. Then, control is transferred to box 3010. At decision box 3050, a determination is made as to whether $W_q(t)$, i.e., the inbound level of service, satisfies predetermined constraints. If so, control is transferred to box 3060, otherwise control is transferred to box 3070. At box 3060, c* is the minimum number of ACD agents which are needed to provide the predetermined inbound level of service and the required outbound call rate and k* is the value of k to use with c* agents in the inventive ACS algorithm to meet the call handling requirements. The value of k* is then input to PBX 120 for use by priority multiplexor 180 in accordance with the above description.

Finally, at box 3070, k is incremented by 1. Then control is transferred to box 3020.

As one can readily appreciate from the above, the flow chart shown in FIG. 11 can be implemented on a processor to enable call center management to determine c and k for use in implementing the inventive ACS algorithm.

The RESQ model which supports the ACD analysis performs according to the following schema:

```
incoming=>note_time=>wait_agent=>talk_agent;  if wait time ≦20 seconds
                    =>request_callback;   otherwise
       talk_agent=>SINK      {caller leaves the simulation model}
       request_callback=>wait (until an agent calls back)=>talk_agent
supervisor=>pause=>wait    {until k agents are free **}
          =>assign agent to return a call (if callback queue is non-empty)
          =>cold_call;   otherwise;
       cold_call=>talk_agent
```

**the special case k = 0 also requires a check that there are no inbound callers queued on trunks.

For the following, assume that all callers who are still in queue after 20 seconds will all request to be called back as soon as possible. FIG. 5 shows, in graphical form, the effect on level of service measures for various values of k for the second situation with callback. The remaining traffic parameters are the same as in FIG. 2.

As one point of comparison, the combined group without callback at k=0 answers only 67% of calls within 90 seconds. However, with callback over 90% percent of calls would be answered within 20 seconds. Thus, the embodiment with callback maintains the outbound call rate and provides a better level of service to inbound calls than the call center with combined inbound/outbound groups.

It is interesting to note that as a smaller percentage of calls require callback, the average time to make a callback increases (as k moves from 0 to 7). This is because, by increasing k, we are focusing on the inbound call queue, at the expense of the outbound (callback) call queue. Thus, as k increases, more calls are waiting less than 20 seconds, but those callers waiting more than 20 seconds and receiving callback are waiting longer.

Figure 6:
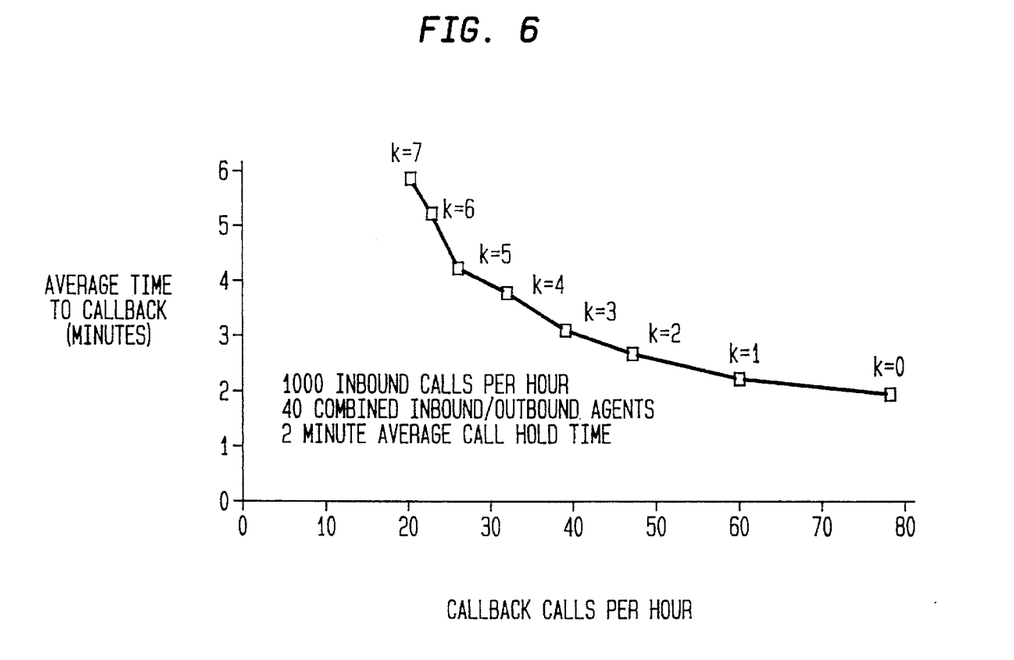
FIG. 6 shows, in graphical form, the inverse relationship between callback rate and the average callback time in accordance with the inventive ACS algorithm as k varies.

FIG. 6 shows, in graphical form, the inverse relationship between the callback rate and the average callback time in accordance with the inventive ACS algorithm as k varies.

Based on simulation results of the combined group callback system, 38 agents can handle 1000 inbound calls per hour, answering 90% within 20 seconds, while making 100 outbound calls per hour. This is in comparison with the 44 agents required for support of these call rates in a traditional call center. Thus, 13% of the agents can be saved with the ACS algorithm in combining inbound and outbound groups and using callback.

In the embodiments discussed above, the arrival rate of inbound calls was assumed to be fixed. However, it is common for there to be peaks and valleys in the inbound call rate during the day. One method of dealing with this situation in the prior art is to provide enough agents to handle the peak inbound call rate with the desired level of service and, as a result, to provide a higher level of service during valleys in the inbound call rate. This method is disadvantageous in that it is expensive since there are often more agents staffed than are needed with the result that many agents are idle (unproductive) most of the time. Another method of dealing with this situation in the prior art is to provide another kind of work for agents during slow periods. In implementing such a method, a call center manager needs to make explicit decisions to roll agents off to other work and to roll them back on to receiving inbound calls. This method is disadvantageous in that, if the busy times occur at unexpected periods, the call center provides poor service even though agents could be answering calls.

This problem is solved in accordance with the present invention by using the inventive ACS algorithm to dynamically assign agents to inbound or outbound calls without low-level manual intervention. While there are no analytic results to aid in the analysis of these queuing systems with time-varying arrival rates, simulation can be used to determine level of service parameters for specific configurations. For example, suppose that the inbound call rate varies according to FIG. 8.

Figure 8:
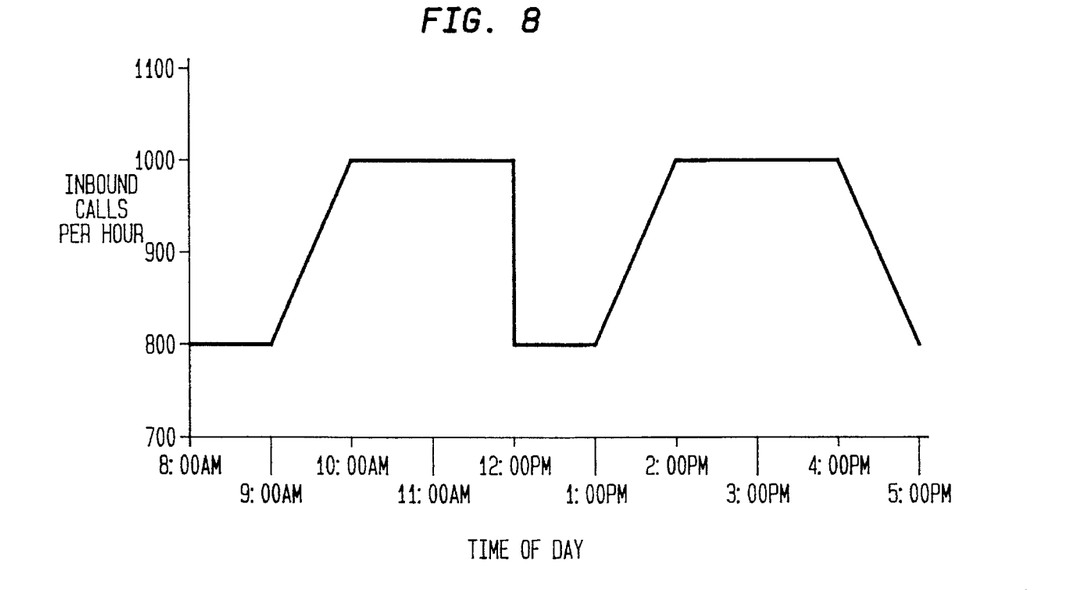
FIG. 8 shows, in graphical form, an example of a time-varying inbound call rate.

The graph shown in FIG. 8 represents a situation where the inbound call rate varies between 800 and 1000 calls per hour during the day. The peak inbound call rate is 1000 calls per hour which is achieved during two 2-hour intervals. The average arrival rate over the course of the 9 hour day is approximately 920 calls per hour. Further suppose that, in addition to the inbound calls it is required to make a total of 4600 outbound calls per day. In accordance with the inventive ACS algorithm the staffing is done as follows: (a) staff a number of agents which can handle the peak load with a fairly large value of k and (b) tune this value of k and the number of agents so that the proper number of outbound calls are made. Using the prior art method, one would need 39 inbound agents to handle 1000 calls per day and 17 outbound agents for making 4600 outbound calls per day. Using the inventive ACS algorithm, 48 agents are required with k set to 0. This represents a savings of 8 agents (almost half of the outbound agents) or 17% of the total number of agents. Thus, under a time-varying inbound call rate, the inventive ACS algorithm increases the call efficiency of the call center by decreasing the number of agents without decreasing the level of service.

Although various minor modifications may be suggested by those versed in the art, it should be understood that we wish to embody within the scope of the patent granted hereon all such modification as reasonably and properly come within the scope of our contribution to the art.

What is claimed is:

1. A method for operating an ACD system which comprises the steps of:

providing a single groupof ACD agents;

accessing each ACD agent of said single group on an availability basis for handling inbound calls, outbound calls, and callback calls;

detecting when inbound calls arrive at the ACD system; when ACD agents complete connected calls; or when arrived calls in an inbound call queue time out;

if an inbound call arrives, determining whether at least one ACD agent is free;
  (a) if an ACD agent is free, assigning the inbound call to the free ACD agent;
  (b) if no ACD agent is free, placing the inbound call in the inbound call queue;

if an ACD agent completes a connected call, assigning an arrived call, if any, from the inbound call queue to the ACD agent;
  (a1) determining whether the number of ACD agents that are free exceeds a predetermined number that is greater than one;
  (b1) if the number of free ACD agents exceeds the predetermined number, assigning one of the free ACD agents to handle a callback call in a callback queue or assigning one of the free ACD agents to handle an outbound call; and if arrived calls in the inbound call queue time out, removing the timed-out arrived calls from the inbound call queue and placing the timed-out arrived calls on the callback queue as callback calls.

2. The method for operating the ACD system of claim 1 wherein step (b1) further comprises determining whether there are any callback calls in the callback queue and, if so, assigning one of the free ACD agents to handle one of the callback calls, otherwise, assigning one of the free ACD agents to handle an outbound call.

* * * * *

UNITED STATES PATENT AND TRADEMARK OFFICE
CERTIFICATE OF CORRECTION

PATENT NO. : 5,519,773
DATED : May 21, 1996
INVENTOR(S) : Dumas et al.

It is certified that error appears in the above-indentified patent and that said Letters Patent is hereby corrected as shown below:

On the title page, item 73 Assignee should read "Siemens Rolm Communications Inc.

Signed and Sealed this

Twelfth Day of November, 1996

Attest:

BRUCE LEHMAN

*Attesting Officer*    *Commissioner of Patents and Trademarks*